United States Patent
Tupy et al.

(10) Patent No.: US 8,316,244 B1
(45) Date of Patent: Nov. 20, 2012

(54) POWER FAILURE SYSTEM AND METHOD FOR STORING REQUEST INFORMATION

(75) Inventors: Jozef Tupy, Mountain View, CA (US); William McGovern, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1132 days.

(21) Appl. No.: 12/120,063

(22) Filed: May 13, 2008

(51) Int. Cl.
*G06F 1/30* (2006.01)
(52) U.S. Cl. ........................................ 713/300
(58) Field of Classification Search ............. 713/320, 713/300
See application file for complete search history.

(56) References Cited

U.S. PATENT DOCUMENTS

| | | | | |
|---|---|---|---|---|
| 4,757,505 A | * | 7/1988 | Marrington et al. | 714/22 |
| 4,959,774 A | * | 9/1990 | Davis | 714/6 |
| 5,050,172 A | * | 9/1991 | Elms et al. | 714/22 |
| 5,495,599 A | * | 2/1996 | Nishiyama | 714/56 |
| 6,195,754 B1 | * | 2/2001 | Jardine et al. | 713/324 |
| 6,336,174 B1 | * | 1/2002 | Li et al. | 711/162 |
| 2002/0029354 A1 | * | 3/2002 | Forehand et al. | 713/340 |

* cited by examiner

*Primary Examiner* — Kim Huynh
*Assistant Examiner* — Eric Chang
(74) *Attorney, Agent, or Firm* — Zilka-Kotab, PC (57) ABSTRACT

A system and method are provided for storing request information in separate memory, in response to the detection of a power failure. This is accomplished by detecting the power failure and, in response, storing the request information in separate memory utilizing a secondary power source. By this feature, the request information is safely stored during a period of power failure. To this end, in various embodiments, the request information may be stored for later use in satisfying corresponding requests when power is restored.

25 Claims, 8 Drawing Sheets

POWER FAILURE SYSTEM AND METHOD FOR STORING REQUEST INFORMATION

FIELD OF THE INVENTION

The present invention relates to storage servers, and more particularly to protecting the integrity of uncommitted data that has not yet been written to stable storage in the event of a loss of power during operation.

BACKGROUND

A storage server is a special purpose processing system used to store and retrieve data on behalf of one or more clients. A storage server typically operates in conjunction with appropriate storage interfaces on behalf of one or more clients to store and manage shared files in a set of mass storage devices, such as magnetic or optical storage-based disks or tapes.

In use, the foregoing storage servers receive requests from the clients and then save information regarding such requests in a log. Such log is subsequently used to service such requests, after which the corresponding information in the log is deleted. During operation, storage servers sometimes experience power failures. In case of such failure, there is a risk that uncommitted data residing in volatile storage may be unprotected.

There is thus a need for addressing these and/or other issues associated with the prior art.

SUMMARY

A system and method are provided for storing request information in separate memory, in response to the detection of a power failure. This is accomplished by detecting the power failure and, in response, storing the request information in separate memory utilizing a secondary power source. By this feature, the request information is safely stored during a period of power failure. In various embodiments, the request information may be stored for later use in satisfying corresponding requests when power is restored. Further, power is preserved during a power failure such that the secondary power source is sufficient for adequately storing the request information, so that the requests may all be acknowledged and any un-serviced requests may be satisfied when a primary power source is restored.

In one example of use according to one embodiment, a plurality of requests is received for being processed. Upon receipt, information associated with the requests is stored in primary memory. In response to the detection of a power failure, a server is reset and such request information is stored in secondary memory, utilizing a secondary power source. After the reset, the server operates with a first capacity that is less than a second capacity with which the server operates after a reset in an absence of the power failure. To this end, power is conserved such that the secondary power source is capable of ensuring that the request information may be adequately stored in the secondary memory. Thus, all requests may be acknowledged, and any un-serviced requests may be satisfied when power is restored.

In one embodiment, the aforementioned primary memory may, include volatile memory and the secondary memory may include non-volatile memory. Further, the secondary memory may be a component of a server. In another embodiment, the secondary memory may be coupled to a server via an input/output (I/O) interface.

DETAILED DESCRIPTION

A system and method are provided for storing request information in separate memory in response to the detection of a power failure. This is accomplished by detecting the power failure and, in response, storing the request information in the separate memory utilizing a secondary power source.

To this end, such request information is stored in the separate memory before at least a portion of the requests are satisfied. By this feature, the request information is safely stored during a period of power failure. Thus, the request information may be stored for later use in satisfying corresponding requests when power is restored. More information will now be set forth regarding the underlying features with which the foregoing technique is made possible, according to various embodiments.

Figure 1:
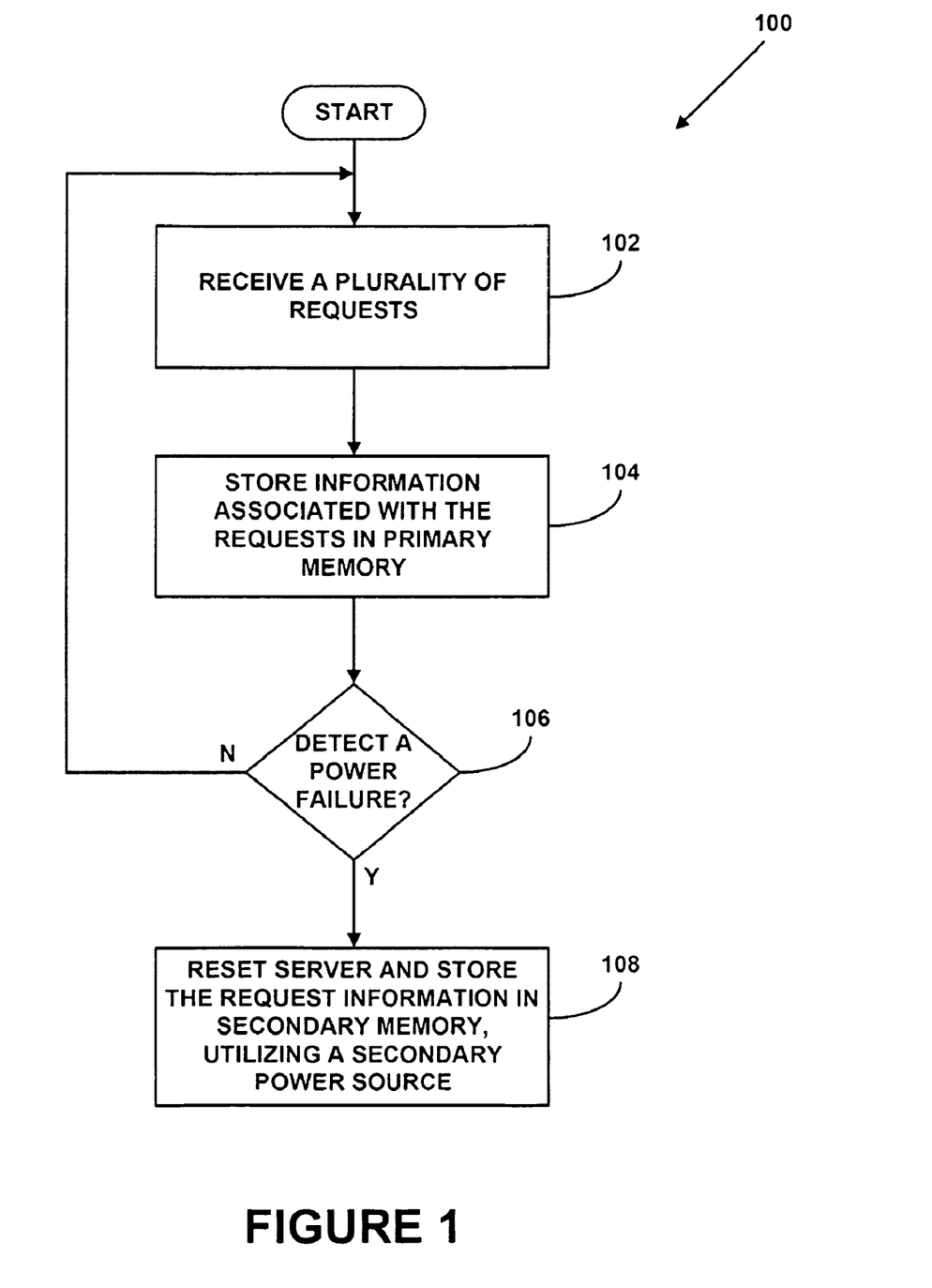
FIG. 1 illustrates a method for storing request information in separate memory in response to the detection of a power failure, in accordance with one embodiment.

FIG. 1 illustrates a method 100 for storing request information in separate memory in response to the detection of the power failure, in accordance with one embodiment. As shown, a plurality of requests are received. See operation 102.

In the context of the present description, such requests may take the form of a request for any operation that causes a persistent change in state of the data managed by a storage system. For example, request may include a write request. In such case, the write request may include data to be stored, a destination to which the data is to be written, a time of the request, and/or any other data that may be useful in writing data to memory. In one possible embodiment, the write request may be received by a server from one of a plurality of clients to direct the server to write data to at least one storage device. Various exemplary server and storage device architectures will be set forth in greater detail during reference to different embodiments illustrated in subsequent figures. Of course, other requests (other than write requests) are contemplated (e.g. read requests, etc.).

Next, in operation 104, information associated with the requests is stored in primary memory of the server. In the context of the present description, such information may include any information that describes or includes the requests, at least in part. For example, the information may include copies of the requests (or portions thereof), metadata associated with the requests, pointers to the requests, and/or any other information capable of being used to ultimately satisfy the requests.

While such requests are received and associated information stored, it is determined whether a power failure takes place. See decision 106. Such detection may be carried out in any desired manner that allows for the functionality set forth hereinbelow. For example, a sensor, power failure detection circuitry, etc. may be utilized to generate a signal in response to a power failure.

In response to the detection of the power failure per decision 106, a server is reset and the aforementioned request information is stored in secondary memory utilizing a secondary power source. See operation 108. After the reset, the server operates with a first capacity that is less than a second capacity with which the server operates after a reset in an absence of the power failure. To this end, power is conserved such that the secondary power source is capable of ensuring that the request information may be adequately stored in the secondary memory. Thus, all requests may be acknowledged, and any un-serviced requests may be satisfied when power is restored.

In one embodiment, the aforementioned primary memory may include volatile memory and the secondary memory may include non-volatile memory (e.g. flash memory, etc.). Of course, it should be noted that the primary memory may include any storage capable of storing the request information, and the secondary memory may include any similarly capable storage that is not necessarily reliant on the same power.

Further, the aforementioned secondary power source may include any power source that is capable of providing power in an absence of a primary power source. For example, in one embodiment, the secondary power source may include a battery, battery based uninterruptible power supply (UPS), etc. Of course, the secondary power source may take any desired form that meets the above definition.

In one embodiment, the secondary memory is a component of the server. More information regarding such optional embodiment will be set forth during reference to FIG. 2. In another embodiment, the secondary memory may be coupled to the server via an input/output (I/O) interface including, but not limited to a peripheral component interface (PCI), and more information regarding such embodiment will be set forth during reference to FIG. 3.

By this design, request information is stored in the secondary memory before at least a portion of the requests are satisfied, and such request information is safely stored during a period of power failure, for later servicing. More illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 2:
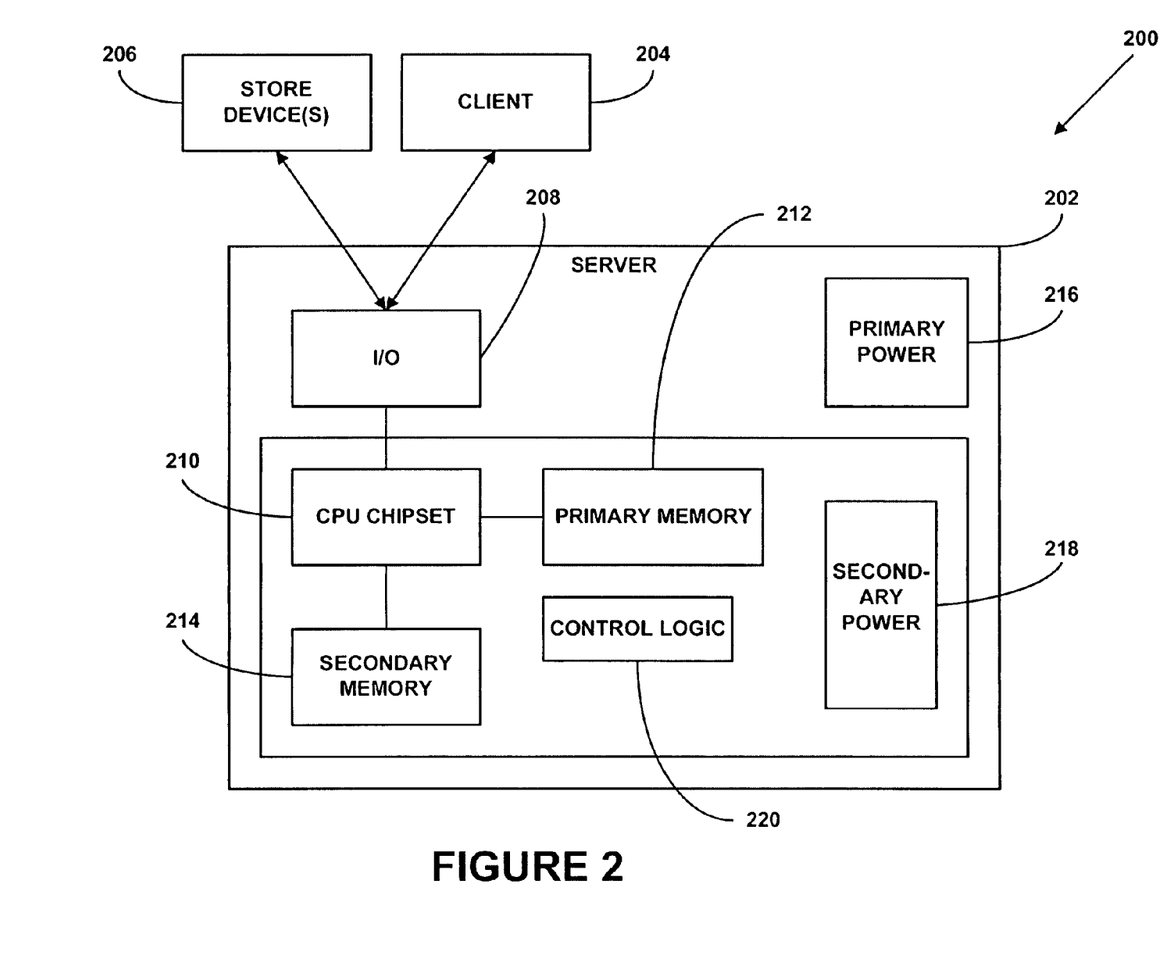
FIG. 2 illustrates a system for storing request information in separate memory in response to the detection of a power failure, in accordance with one embodiment where the separate memory is a component of a server.

FIG. 2 illustrates a system 200 for storing request information in separate memory in response to the detection of the power failure, in accordance with one embodiment where the separate memory is a component of a server 202. As an option, the system 200 may be implemented in the context of the framework and/or functionality of FIG. 1. Of course, however, the system 200 may be implemented in any desired environment. It should be noted that the definitions provided above equally apply to the present description.

As shown, the server 202 remains in communication with at least one client 204 and at least one storage device 206. In one embodiment, such communication may be provided by way of a local or wide area network (not shown). In use, requests (e.g. write requests, etc.) from the clients 204 are received by the server 202. The server 202, in turn, satisfies such write requests by writing data to the storage device 206.

To accomplish this, the server 202 includes an input/output (I/O) subsystem 208 for communicating the write requests and data writes with the client 204 and the storage device 206. Still yet, such I/O subsystem 208 is coupled to a central processing unit (CPU) chipset 210 which controls the processing of the write requests for the purpose of initiating the associated data writes. The CPU chipset 210 is further coupled to primary memory 212. In use, information associated with the write requests is stored in the primary memory 212 for being processed to initiate the data writes to the storage device 206.

For reasons that will soon become apparent, the server 202 further includes secondary memory 214 coupled to the CPU chipset 210. During normal operation, the CPU chipset 210 and other components shown rely on a primary power source 216. However, to address a situation where the primary power source 216 fails, further provided is a secondary power source 218 for powering the illustrated components to carry out a de-staging process under the control of a controller 220.

Such de-staging process may serve to transfer the write request information from the primary memory 212 to the secondary memory 214, where it will not be lost as a result of the power failure. More information regarding one possible de-staging process in accordance with one embodiment will be set forth during reference to FIGS. 4A-4B.

Figure 3:
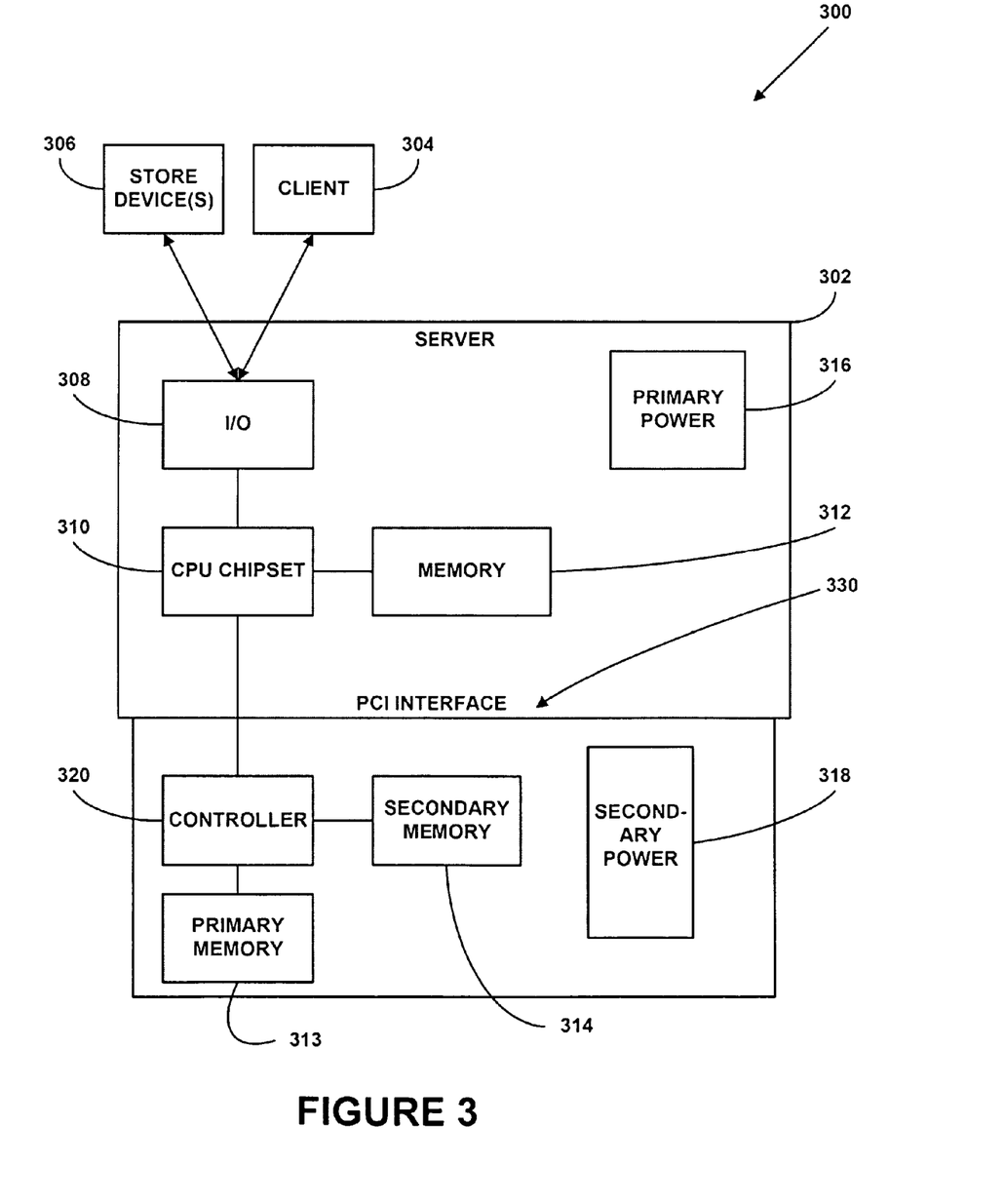
FIG. 3 illustrates a system for storing request information in separate memory in response to the detection of a power failure, in accordance with one embodiment where the separate memory is a separate component coupled to a server.

FIG. 3 illustrates a system 300 for storing write request information in separate memory in response to the detection of the power failure, in accordance with one embodiment where the separate memory is a separate component coupled to a server 302. As an option, the system 300 may be implemented in the context of the framework and/or functionality of FIG. 1. Of course, however, the system 300 may be implemented in any desired environment. It should be noted that the definitions provided above equally apply to the present description.

As shown, the server 302 remains in communication with at least one client 304 and at least one storage device 306. In use, write requests from the clients 304 are received by the server 302. The server 302, in turn, satisfies such write requests by writing data to the storage device 306.

Similar to the system 200 of FIG. 2, the server 302 includes an I/O subsystem 308 for communicating the write requests and data writes with the client 304 and the storage device 306. Still yet, such I/O subsystem 308 is coupled to a CPU chipset 310. The CPU chipset 310 serves to control the processing of the write requests for the purpose of initiating the data writes.

With continuing reference to FIG. 3, the CPU chipset 310 is further coupled to memory 312. During normal operation, the CPU chipset 310 and other components shown rely on a primary power source 316. For reasons that will soon become apparent, the server 302 further includes primary memory 313 and secondary memory 314 coupled to a controller 320 which, in turn, is coupled to the CPU chipset 310. Still yet, to address a situation where the primary power source 316 fails, further provided is a secondary power source 318.

Unlike the system 200 of FIG. 2, the primary memory 313, the secondary memory 314, the secondary power source 318, and the controller 320 are separate from the server 302. In one embodiment, the primary memory 313, the secondary memory 314, the secondary power source 318, and the controller 320 may reside on a card which, in turn, is coupled to the server 302 in the manner shown. In various embodiments, such coupling may be accomplished via a PCI interface 330, or any other interface, for that matter.

In use, information associated with the write requests is first stored in the memory 312, after which a copy is transferred to the primary memory 313, via a direct memory access (DMA) operation, etc. Thereafter, such write request information may be processed by the CPU chipset 310, for initiating the data writes to the storage device 306.

In a situation where the primary power source 316 fails, the controller 320 is adapted to carry out a de-staging process under the direction of the controller 320. Such de-staging process serves to transfer the write request information from the primary memory 313 to the secondary memory 314, where it will not be lost as a result of the power failure. More information regarding one possible de-staging process in accordance with one embodiment will now be set forth.

Figure 4A:
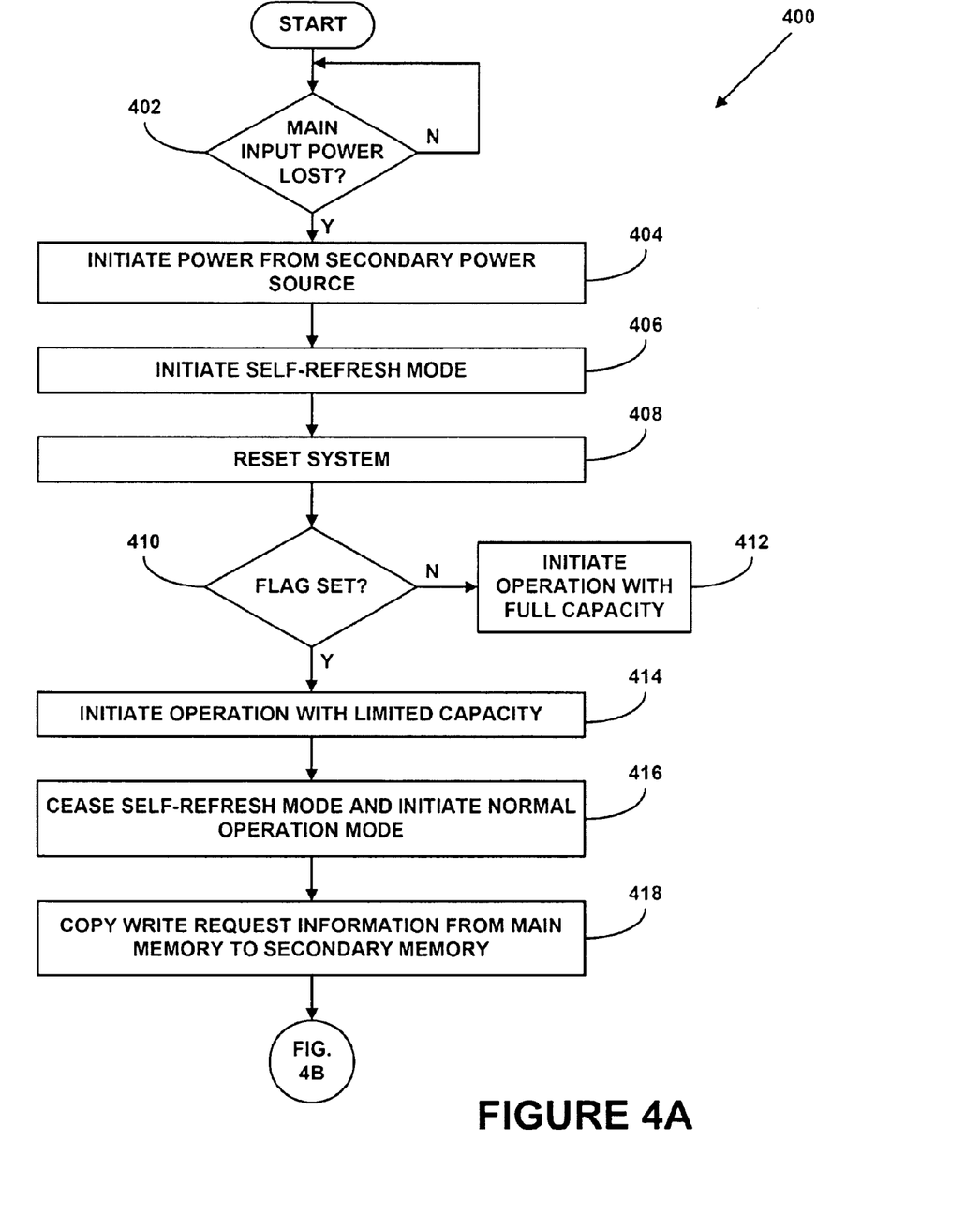
FIGS. 4A-4B illustrates a method for carrying out a de-staging process, in accordance with one embodiment.
Figure 4B:
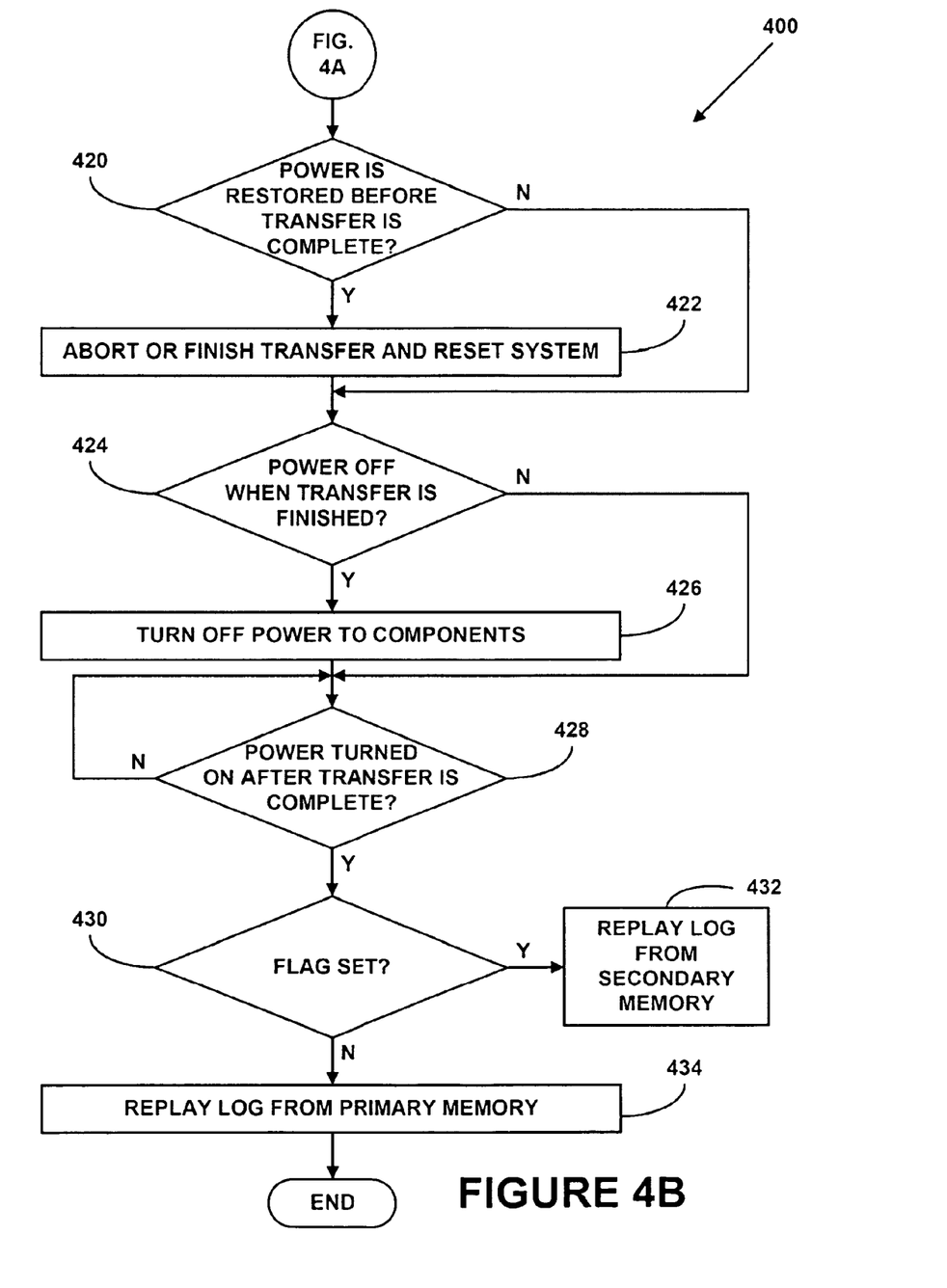

FIGS. 4A-4B illustrates a method 400 for carrying out a de-staging process, in accordance with one embodiment. As an option, the method 400 may be carried out in the context of the framework and/or functionality of FIGS. 1-3. For example, the method 400 or a derivative thereof may be carried out utilizing the controllers 220, 320 of FIGS. 2-3. Of course, however, the system 300 may be implemented in any desired environment. Again, the definitions provided above equally apply to the present description.

With reference first to FIG. 4A, it is initially determined whether main power is lost. See decision 402. In such case, it is possible that a primary memory (e.g. primary memory 212, 313, etc.) may include write request information for which data writes have yet to be fulfilled. To avoid a failure to satisfy such requests, the method 400 may proceed as shown.

Specifically, in response to the detection of the power failure, the following operations may be carried out (in any desired order). For example, power from a secondary power source (e.g. secondary power source 218, 318, etc.) may be initiated. Note operation 404.

Next, a standby mode is initiated in operation 406. Such standby mode may include any operation in which the primary memory retains and protects its contents in secondary memory. Such standby mode may also protect contents of the memory from initialization/erasure by BIOS, operating system initialization etc. In one embodiment, such standby mode may involve refreshing the primary memory utilizing the secondary power source. To this end, any write request information already stored in the primary memory is preserved during the subsequent operations set forth below. In one embodiment, such refresh operation may occur independently of any intervention from other components such as a controller (e.g. controller 220, 320, etc.) that initiates the de-staging process.

Still yet, in operation 408, the server is reset. In one embodiment, this may be accomplished utilizing the secondary power source. It should be noted that resetting the server may or may not necessarily be the same as a reset operation under normal conditions. For instance, only selected components necessary for the de-staging operation may be reset.

After the reset, the server operates may operate with a limited or full capacity, based on an instruction from the controller. Such instruction may, in one possible embodiment, take the form of a flag (e.g. a hardware bit, etc). To this end, it may be determined whether such flag is set per decision 410. Further, if the flag is not set and thus no de-staging process is required, operation of the server may be initiated with full capacity, per operation 412.

On the other hand, if the flag is set, operation of the server may be initiated with a limited capacity. See operation 414. Specifically, operation of the server may be initiated with first capacity that is less than a second capacity with which the server operates after a reset in an absence of the power failure.

In one embodiment, such limited capacity may be characterized by limited or no power allocated for an I/O subsystem (e.g. I/O subsystem 208, 308, etc.), since such subsystem requires significant power and is not necessarily required to permanently store the write request information. Still yet, any software functionality supporting unpowered devices would not need to operate, thus saving power.

With continuing reference to FIG. 4A, the standby mode of operation 406 is ceased and normal operation of the CPU chipset may be initiated, per operation 416. To this end, the CPU chipset may effect a transfer of write request information from the primary memory to permanent memory (e.g. permanent memory 214, 314, etc.), under the control of the controller.

Turning now to FIG. 4B, the method 400 continues by determining whether power is restored before the aforementioned transfer is complete. See decision 420. In such situation, a variety of actions may be taken in operation 422. For example, the transfer may be aborted after which the server may be reset, in one embodiment. In such embodiment, the server may be reset utilizing the write request information stored in the primary memory. In another embodiment, the storage of the write request information in the portable memory may be completed, and the server may be reset. In the latter embodiment, the server may be reset utilizing the write request information stored in the primary memory and/or the permanent memory.

Next, in decision 424, it is determined whether the power failure still exists after the write request information is stored in the portable memory. If so, the supply of power from the secondary power source may be ceased to conserve such source, in one embodiment. See operation 426. While not shown, another embodiment is contemplated whereby the primary memory is refreshed on a continued basis, utilizing the secondary power source. In such embodiment, the secondary power source may maintain the contents of the primary memory for a limited amount of time such that, if main power is restored, the server may be replayed after a reset utilizing the write request information stored in the primary memory. In other words, the write request may be replayed from the primary memory and not from the secondary memory, making the replay time shorter.

Finally, it may be determined when power is subsequently restored after the transfer is complete. See decision 428. In such case, the request information may be "replayed" utilizing the main or permanent memory, again under the direction of the controller and a flag. In the context of the present description, such replay may involve satisfying any pending write requests reflected in the write request information (which may take the form of a log, etc.). For example, if a predetermined flag is set, the request information may be replayed utilizing the permanent memory, per operation 432. On the other hand, if the predetermined flat is not set, the write request information may be replayed utilizing the primary memory, per operation 434.

Figure 5:
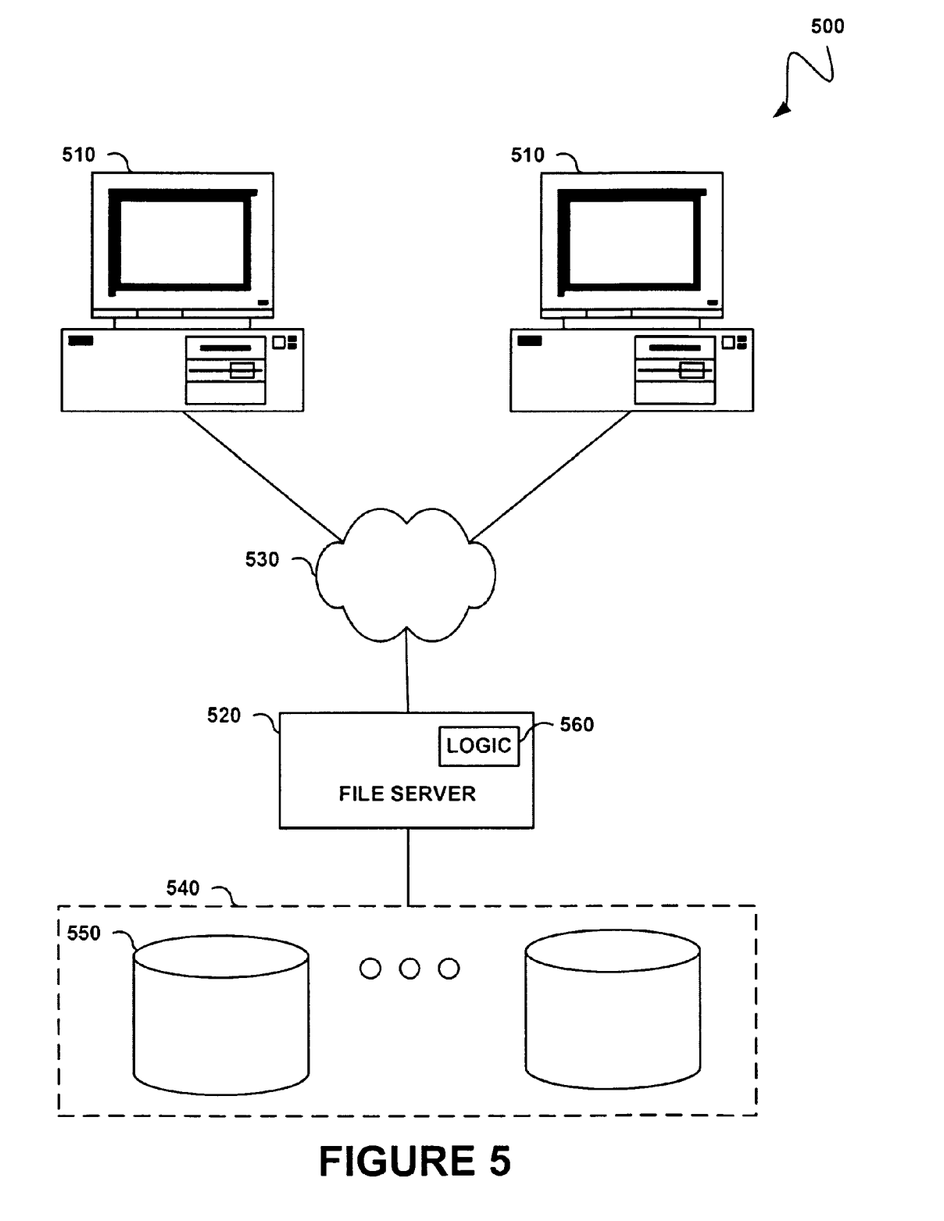
FIG. 5 is an illustration of a network environment in which an embodiment may be implemented.

FIG. 5 is an illustration of a network environment 500 in which an embodiment may be implemented. As an option, the network environment 500 may represent one possible implementation of the systems 200, 300 of FIGS. 2-3. Of course, however, it should be noted that the network environment 500 may be used in any desired environment and incorporate any one or more of the features described in the previous figures.

Of course, the various embodiments described herein are not limited to any particular environment, and may be implemented in various storage processes. In the present illustration, the storage system includes a storage server, such as a server 520. The server 520 is coupled with a storage subsystem 540, which includes a set of mass storage devices 550, and to a set of clients 510 through a network 530, such as a local area network (LAN) or other type of network. Each of the clients 510 may be, for example, a conventional personal computer (PC), workstation, or any of the other example clients set forth earlier.

The storage subsystem 540 is managed by the server 520. For example, the server 520 may receive and respond to various read and write requests from the clients 510, directed to data stored in or to be stored in the storage subsystem 540. The mass storage devices 550 in the storage subsystem 540 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The server 520 may have a distributed architecture. In another embodiment, the server 520 may have an integrated architecture, where the network and data components are all contained in a single box or unit. The server 520 further may be coupled through a switching fabric to other similar storage systems (not shown) that have their own local storage subsystems. In this way, all of the storage subsystems can form a single storage pool, to which any client of any of the storage systems has access.

In one embodiment, the server 520 may be equipped with hardware and/or software logic 560 for carrying out the functionality of FIGS. 1-4B. While, in the present embodiment, such logic 560 is shown to be a component of the server 520, it should be noted that it may reside elsewhere as well (e.g. exterior of the server 520, etc.).

Figure 6:
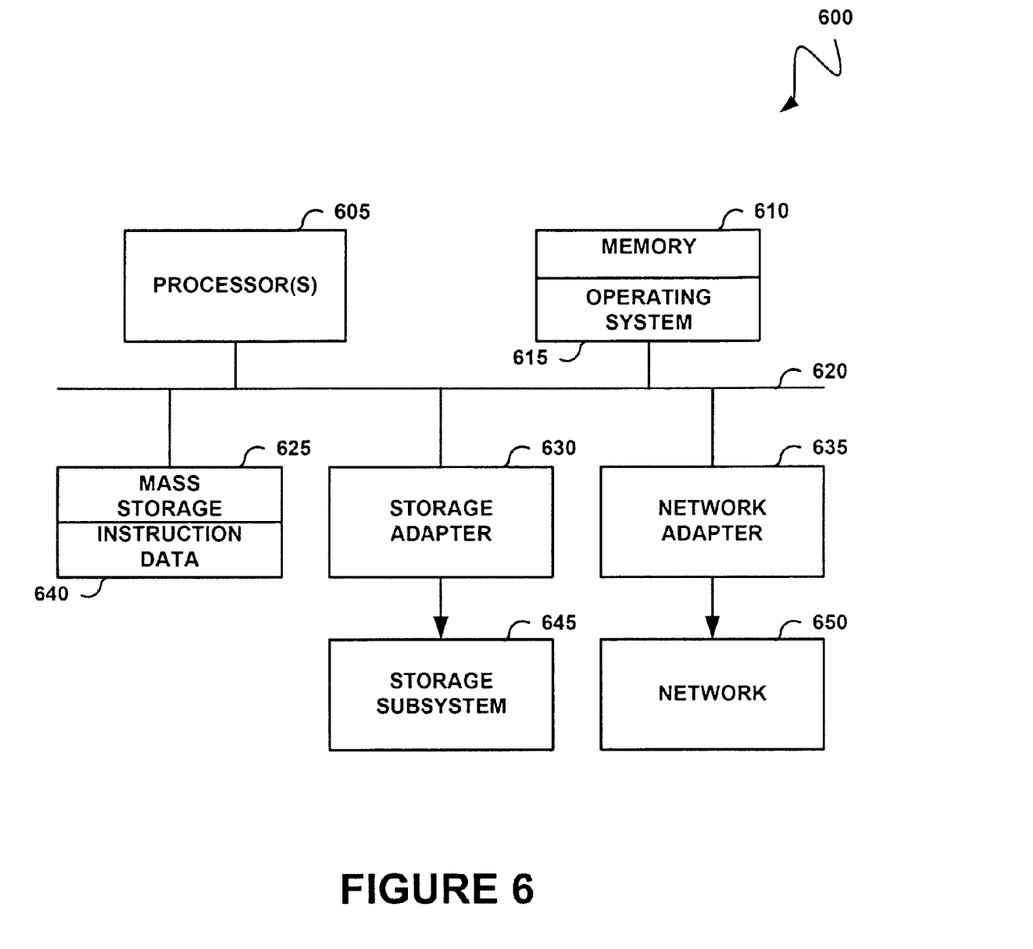
FIG. 6 is a block diagram illustrating architecture of a server that may include an embodiment.

FIG. 6 is a block diagram illustrating architecture of a server 600 that may include an embodiment. In one embodiment, the server 600 may represent the server 520 of FIG. 5. Of course, however, it should be noted that the server 600 may be implemented in any desired environment and incorporate any one or more of the features described in the previous figures.

The server 600 includes one or more processors 605 and memory 610 coupled to a interconnect 620. The interconnect 620 shown in FIG. 6 is an abstraction that represents any one or more separate physical buses, point-to-point connections, or both connected by appropriate bridges, adapters, or controllers. The interconnect 620, therefore, may include, for example, a system bus, a Peripheral Component Interconnect (PCI) bus, a HyperTransport or industry standard architecture (ISA) bus, a small computer system interface (SCSI) bus, a universal serial bus (USB), I1C (I2C) bus, or an Institute of Electrical and Electronics Engineers (IEEE) standard 1394 bus, sometimes referred to as "Firewire".

The processor(s) 605 may include central processing units (CPUs) of the server 600 and, thus, control the overall operation of the server 600. In certain embodiments, the processor(s) 605 accomplish this by executing software stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the primary memory of the server 600. The memory 610 represents any form of random access memory (RAM), read-only memory (ROM), flash memory, or the like, or a combination of such devices. In use, the memory 610 stores, among other things, the operating system 615 of the server 600.

Also connected to the processor(s) 605 through the interconnect 620 may be one or more internal mass storage devices 625, a storage adapter 630 and a network adapter 635. The internal mass storage devices 625 may be or include any medium for storing large volumes of instructions and data 640 in a non-volatile manner, such as one or more magnetic or optical-based disks. The storage adapter 630 allows the server 600 to access a storage subsystem 645 and may be, for example, a Fibre Channel adapter or a SCSI adapter. The storage adapter 630 may interface with a D-module portion of the server. The network adapter 635 provides the server 600 with the ability to communicate with remote devices, such as clients, over a network 650 and may be, for example, an Ethernet adapter. The network adapter 635 may interface with an N-module portion of the server 600.

Figure 7:
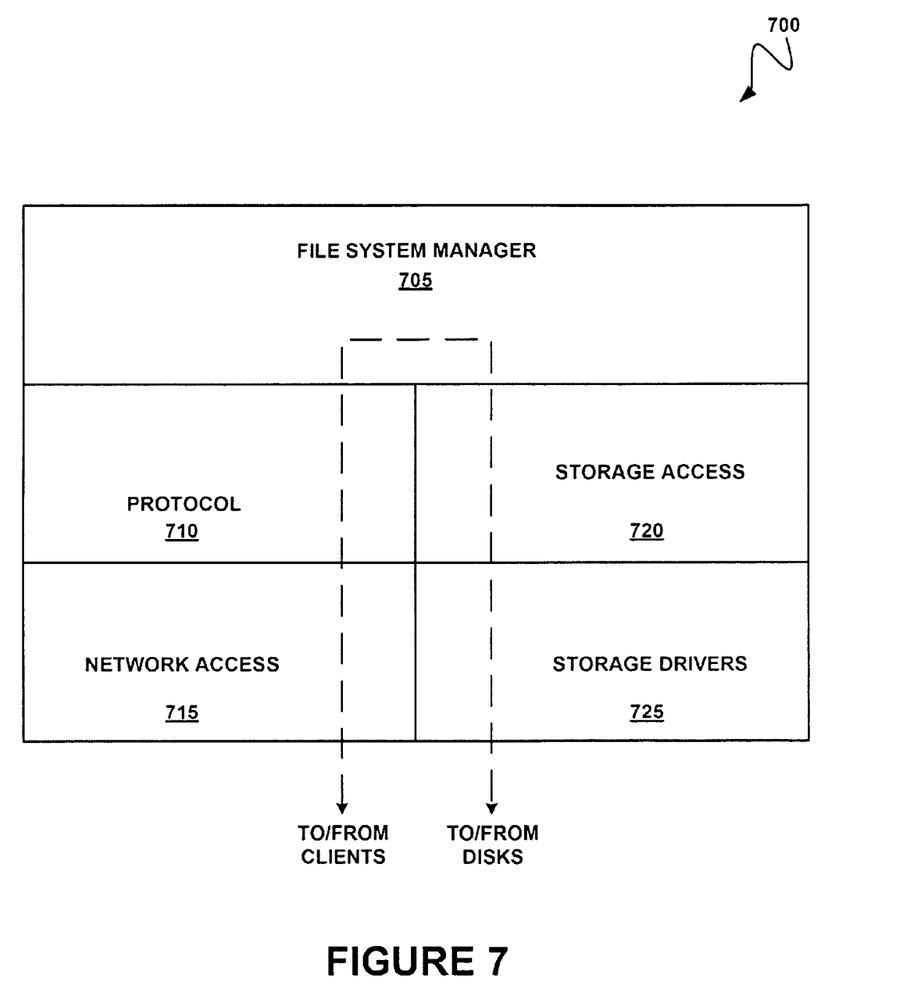
FIG. 7 illustrates an example of the operating system of a server according to one possible embodiment.

FIG. 7 illustrates an example of the operating system 700 of a server according to one possible embodiment. As an option, the operating system 700 may be installed on the server 600 of FIG. 6. Of course, however, it should be noted that the operating system 700 may be used in any desired environment and incorporate any one or more of the features described in the previous figures.

As shown, the operating system 700 includes several modules, or "layers." These layers include a file system manager 705. The file system manager 705 is software that keeps track of the directory structure (hierarchy) of the data stored in a storage subsystem and manages read/write operations on the data (i.e. executes read/write operations on the disks in response to client requests).

The operating system 700 also includes a protocol layer 710 and an associated network access layer 715, to allow a server to communicate over a network to other systems, such as clients. The protocol layer 710 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 715 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 700.

The operating system 700 further includes a storage access layer 720 and an associated storage driver layer 725 to allow a server to communicate with a storage subsystem. The storage access layer 720 implements a higher-level disk storage protocol, such as RAID, while the storage driver layer 725 implements a lower-level storage device access protocol, such as Fibre Channel Protocol (FCP) or SCSI. In one embodiment, the storage access layer 720 may implement a RAID protocol, such as RAID-4 or RAID-DPT™ (RAID double parity for data protection provided by Network Appliance, Inc.), and therefore may alternatively be referred to as RAID layer 720.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various

What is claimed is:

1. A method for conserving power during a power failure, comprising:
   receiving a plurality of requests;
   acknowledging the requests;
   storing request information associated with the requests in primary memory;
   detecting a power failure; and
   in response to the detection of the power failure,
      resetting a server utilizing a secondary power source, and
      storing the request information in secondary memory utilizing the secondary power source;
   wherein, after the reset, the server operates with a first capacity that is less than a second capacity with which the server operates after a reset in an absence of the power failure, for conserving power such that the secondary power source is sufficient for storing the request information in the secondary memory so that the requests can be acknowledged and un-serviced requests are satisfied when a primary power source is restored;
   wherein the un-serviced requests are satisfied from the secondary memory when the primary power source is restored;
   wherein it is determined whether power is restored before the request information is stored in the secondary memory.

2. The method of claim 1, wherein the primary memory includes volatile memory.

3. The method of claim 1, wherein the secondary memory includes non-volatile memory.

4. The method of claim 1, and further comprising refreshing the primary memory utilizing the secondary power source, in response to the detection of the power failure.

5. The method of claim 1, wherein the request information is stored in the secondary memory before at least a portion of the requests are satisfied.

6. The method of claim 1, wherein, after the reset, the server operates with the first capacity or the second capacity based on a flag.

7. The method of claim 6, wherein the flag includes a hardware bit.

8. The method of claim 6, wherein if the flag is set, operation of the server is initiated with the first capacity.

9. The method of claim 1, and further comprising determining whether power is restored before the request information is stored in the secondary memory.

10. The method of claim 9, and further comprising finishing the storage of the request information in the secondary memory and resetting the server, if it is determined that the power is restored before the request information is stored in the secondary memory.

11. The method of claim 10, wherein the server is reset utilizing the request information stored in the primary memory.

12. The method of claim 10, wherein the server is reset utilizing the request information stored in the secondary memory.

13. The method of claim 9, and further comprising aborting the storage of the request information in the secondary memory and resetting the server, if it is determined that the power is restored before the request information is stored in the secondary memory.

14. The method of claim 1, and further comprising determining whether the power failure still exists after the request information is stored in the secondary memory.

15. The method of claim 14, and further comprising ceasing a supply of power from the secondary power source, if it is determined that the power failure still exists after the request information is stored in the secondary memory.

16. The method of claim 14, and further comprising refreshing the primary memory utilizing the secondary power source, if it is determined that the power failure still exists after the request information is stored in the secondary memory.

17. The method of claim 1, wherein the secondary memory is a component of a server.

18. The method of claim 1, wherein the secondary memory is coupled to a server via an input/output interface.

19. The method of claim 1, wherein the requests are received via a network.

20. The method of claim 1, wherein the primary memory is primary memory of the server, and the secondary memory is a component of the server.

21. The method of claim 1, wherein the primary memory is primary memory of the server, and the secondary memory is coupled to the server via an interface.

22. The method of claim 1, wherein the request includes a request for an operation that causes a persistent change in a state of data managed by the server.

23. The method of claim 1, wherein the request is received by the server from one of a plurality of clients, the request directing the server to write data to at least one storage device.

24. An apparatus for conserving power, comprising:
   a primary memory;
   a secondary memory;
   input/output for receiving a plurality of requests and acknowledging the requests;
   a secondary power source; and
   a controller for storing request information associated with the requests in the primary memory, and, in response to the detection of a power failure, resetting a server utilizing the secondary power source and storing the request information in the secondary memory utilizing the secondary power source;
   wherein, after the reset, the server operates with a first capacity that is less than a second capacity with which the server operates after a reset in an absence of the power failure, for conserving power such that the secondary power source is sufficient for storing the request information in the secondary memory so that the requests can be acknowledged and un-serviced requests are satisfied when a primary power source is restored;
   wherein the apparatus is operable such that the un-serviced requests are satisfied from the secondary memory when the primary power source is restored;
   wherein the controller determines whether power is restored before the request information is stored in the secondary memory.

25. A system for conserving power during a power failure, comprising:
   at least one storage device; and
   an apparatus in communication with the at least one storage device, the apparatus including:
      a primary memory,
      a secondary memory,
      input/output for receiving a plurality of requests from at least one client, acknowledging the requests, and satisfying the requests by writing to the at least storage device, a secondary power source, and a controller for storing request information associated with the requests in the primary memory, and, in response to the detection of a power failure, resetting a server utilizing the secondary power source and storing the request information in the secondary memory utilizing the secondary power source; wherein, after the reset, the server operates with a first capacity that is less than a second capacity with which the server operates after a reset in an absence of the power failure, for conserving power such that the secondary power source is sufficient for storing the request information in the secondary memory so that the requests can be acknowledged and un-serviced requests are satisfied when a primary power source is restored;

wherein the system is operable such that the un-serviced requests are satisfied from the secondary memory when the primary power source is restored;

wherein the controller determines whether power is restored before the request information is stored in the secondary memory.

* * * * *